May 30, 1950 R. B. DOME 2,509,729
SYNCHRONIZING SYSTEM
Filed May 1, 1946
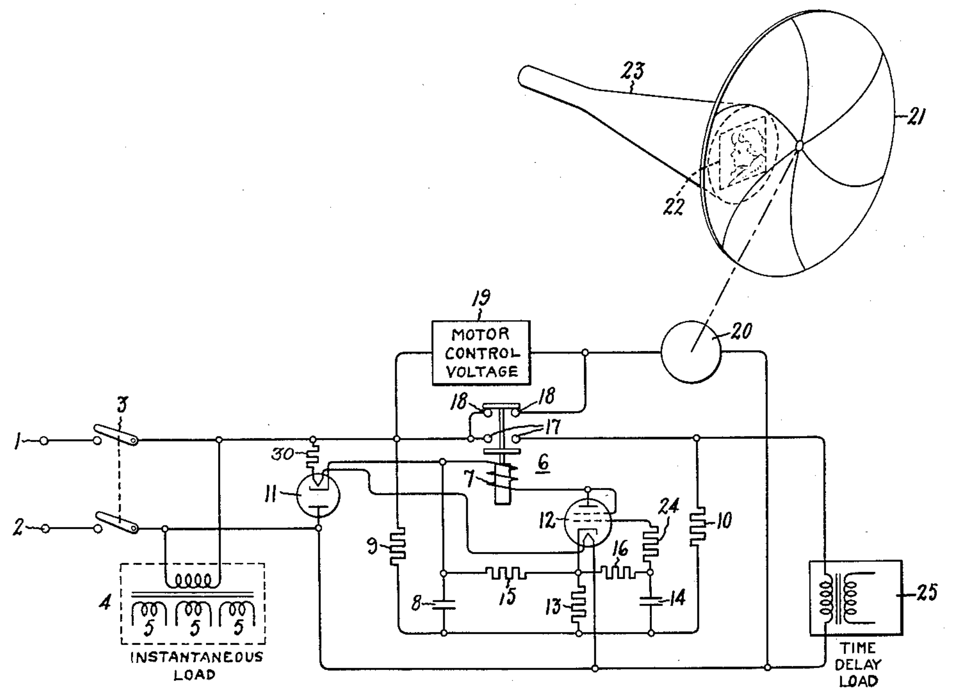
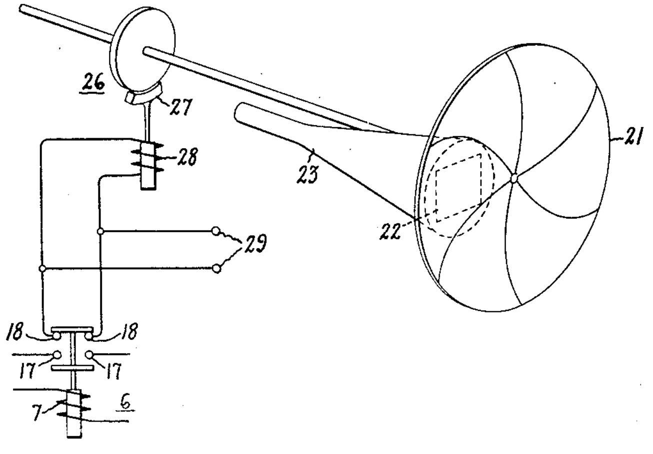
Inventor:
Robert B. Dome
by Merton D Moore
His Attorney.

Patented May 30, 1950 2,509,729

UNITED STATES PATENT OFFICE 2,509,729

SYNCHRONIZING SYSTEM

Robert B. Dome, Bridgeport, Conn., assignor to General Electric Company, a corporation of New York Application May 1, 1946, Serial No. 666,276

3 Claims. (Cl. 178—69.5)

This invention relates to control of the application of energizing power to electrical equipment, including in particular color television receivers.

In one method of color television the visual program is reconstituted in full color by means of a succession of color filters interposed between an image in varying intensities of white light and the observer. The filters consist of segments of a rotatable disk, each segment being composed of a color filter material and arranged in sequential order corresponding to the order of scanning by the television transmitter. Means are provided to rotate the disk in synchronism with signals from the television transmitter, such means including for example the control equipment disclosed in my copending application, Ser. No. 666,277, filed May 1, 1946, and the copending application of R. F. Wood, Ser. No. 666,275, filed May 1, 1946 (now Patent 2,502,195, issued March 28, 1950), both assigned to the same assignee as the present application.

In starting a television receiver of the above described type, time delay is desirable between the time some portions of the system are energized and the time power is applied to other portions thereof. Such receivers may contain gaseous discharge devices, for example thyratron tubes, the cathodes of which should reach normal operating temperature before the application of cathode-anode path potential. Furthermore, it is desirable to permit the motor connected to the color disk to reach a rotational velocity very nearly the desired value before energizing the synchronizing system.

It is an object of my invention to provide an improved time delay relay system.

A further object of my invention is to provide a time delay relay system suitable for use in connection with color television receivers.

Another object of my invention is to provide a time delay relay system having a positive hold-in action.

Further it is an object of my invention to provide a time delay relay system in which noise and burning associated with closing the relay contacts is minimized by additional closing force applied when the contacts first close.

Another object of my invention is to provide a time delay relay system having a predetermined time to reclose after a power interruption, this time being adjustable independently of the closing time.

Yet another object of my invention is to provide a time delay relay system having a positive closing action and which will reclose after a power interruption, the time for reclosure being dependent on the duration of the interruption.

The novel features which I believe to be characteristic of my invention are set forth with particularity in the appended claims. My invention itself, both as to its organization and method of operation may best be understood by reference to the following description taken in connection with the accompanying drawings in which Fig. 1 shows a general schematic diagram thereof and Fig. 2 shows a modification.

Referring now to Fig. 1, 1 and 2 represent terminals connected to a source of alternating voltage suitable for energizing the color television receiving system. A manual control switch, shown generally at 3, is provided to initiate operation of the system, this switch being connected to energize simultaneously unit 4 and the control circuits. Unit 4 consists of the circuits leading to the components of the receiver desired immediately to be energized, including in particular the heater circuits to the various discharge devices. To this end, unit 4 may for example include a transformer having a plurality of secondary windings 5, each connected to an appropriate group of heater circuits. It is the purpose of the time delay relay shown generally at 6 to energize appropriate circuits at a predetermined time after switch 3 is closed, this relay operating when the current flow in winding 7 reaches a predetermined value.

When switch 3 is closed, the heaters of devices 11 and 12 are energized through resistance 30. When the cathode of device 11 reaches a temperature producing electron emission, condenser 8 charges by reason of the voltage applied thereacross from the voltage divider comprising resistances 9 and 10 and rectifier device 11, the voltage being in direction positively to charge the terminal of that condenser connected to the cathode of device 11. This provides unidirectional cathode-anode space path voltage of the proper polarity for electron discharge device 12 by means of the connection through relay coil 7 and cathode resistance 13. The value of charge at condenser 8 is determined primarily by the relative values of resistances 9 and 10 inasmuch as the impedance of load 25 to the flow of this charging current is very small as compared with the values of these resistances. If, for example, the load 25 consists of a transformer having its primary winding connected to resistance 10 and the anode of rectifier 11, the only effect of this winding is to act as a smoothing reactor and even this effect is not significant at the small values of current flow through resistance 10.

Space current flow through electron discharge device 12 at the instant switch 3 is closed is very small because the cathode of that device is made positive with respect to the control electrode. This results from the fact that the cathode of device 12 becomes positive by reason of the small cathode-anode space current flow that does take place and the control electrode is maintained at the voltage of the negative terminal of condenser 8 over any short interval of time. In addition, a small positive bias at the cathode of device 12 resulting from the voltage divider action of resistances 13 and 15 further reduces current flow in device 12. Actuation of relay 6 is thereby prevented.

After the instant of closing switch 3, the voltage at condenser 14 builds up through the charging path including resistance 16. This action is cumulative, the space current in device 12 and the voltage drop across resistance 13 increasing as condenser 14 charges. Eventually the charge on condenser 14 is sufficient to cause space current flow in device 12 to reach the value required to operate relay 6, thus closing the circuit across contacts 17 and opening the circuit across contacts 18.

At the instant relay 6 is actuated, a closed circuit is provided across contacts 17. This connects resistance 10 in parallel relation with resistance 9, thereby causing condenser 8 to charge through the parallel path comprising these resistances. Inasmuch as the steady current flow through device 12 is relatively small, this causes condenser 8 to charge to a value more nearly equal to the full line voltage applied to terminals 1 and 2, a value in excess of that associated with the voltage divider action of resistance 9 and 10 when relay 6 is in the unenergized condition. This increased applied voltage further increases the current flow in device 12 over the value at the instant of closing relay 6, thereby causing this relay to be held tightly in the closed position and preventing the noise, contact burning, and wear associated with closing by the slow build-up of current flow in device 12. Furthermore, any tendency of the relay to chatter is avoided.

When the circuit across contacts 17 is closed, unit 25 is energized at the full line voltage, thus causing normal operating voltage to be applied to the circuits for which time delay is desired. Such circuits, for example, may be the cathode-anode space path voltage sources for gaseous discharge devices, the predetermined time delay permitting the heaters of these devices to reach full operating temperature before application of cathode-anode space path voltage. When relay 6 is in the open position, resistances 9 and 10 reduce the current flow in unit 25 to such a small value that the voltage appearing at these circuits is insignificant in amount and does no harm to the equipment.

At the instant switch 3 is closed, full line voltage is applied to motor 20 through the closed circuit across contacts 18. This motor is connected to drive color disk 21 which is interposed between the observer and television image 22 on cathode ray tube 23. When this voltage is applied, motor 20 is accelerated at a rapid rate and reaches a rotational velocity slightly in excess of the value corresponding to synchronism with scanning operations at the television transmitter in a comparatively short interval of time. As the time relay 6 operates, the closed circuit across contacts 18 is opened. This permits motor control system 19 to vary the voltage across motor 20 and bring disk 21 into exact synchronism with the television transmitter. Acceleration of motor 20 in this manner provides a number of advantages. In the first place, the acceleration is made more rapid by reason of the fact that full voltage is applied to the motor and unit 19 cannot introduce a decelerating component of motor voltage. In addition, if the motor control uses thyratrons or other circuit components requiring a time period before reaching an operating condition, one time delay is avoided as this unit reaches an operating condition while the motor comes up to speed. Otherwise, time delay must be allowed both for unit 19 to become operable and for motor 20 to accelerate to full speed, thus increasing the time interval between initiating first action to prepare the receiver for operation and the time it reaches operating condition.

Motor control 19 may be of any type wherein a variable voltage drop is interposed between motor 20 and line terminals 1 and 2 to alter the effective voltage applied to the motor and thereby control the operating speed thereof. One system of this type suitable for use in connection with an induction type motor is described and claimed in my copending application, Ser. No. 666,277, filed May 1, 1946, and assigned to the same assignee as the present invention.

In the event energizing voltage across terminals 1 and 2 is lost, condenser 8 discharges through the space path of electron discharge device 12 and relay 6 opens. Condenser 14 simultaneously discharges through two separate current paths, one including the control electrode-cathode space path of device 12 and the other including resistance 16. Inasmuch as resistance 16 is of relatively large value to achieve a long time constant in closing relay 6, the principal current flow is through device 12 in the path comprising resistances 24 and 13. The rate of discharge through this path, and hence the voltage decay across capacitor 14 depends on the values of resistances 13 and 24 and may be adjusted by varying the value of resistance 24. Hence, the time required to build up voltage across condenser 14 and the time required for that voltage to decay are independently adjustable, the former being dependent primarily on the value of resistance 16 and the latter being primarily dependent on the value of resistance 24. Loss of heating power at device 12 at the instant power across terminals 1 and 2 is lost does not prevent cathode-control electrode space current flow in device 12 inasmuch as the cathode remains at an emitting temperature for some time after loss of heating power. If energizing voltage is restored before the charge on condenser 14 disappears, the control electrode of device 12 will have a smaller negative bias voltage at the instant of restoration of voltage at terminals 1 and 2 than under normal starting conditions. Consequently the time required to build up space current flow in device 12 to the value required to close relay 6 is reduced and power applied to unit 25, thus restoring control to unit 19 after correspondingly smaller time interval. In fact, if the power is restored after a very short time, condenser 14 may have sufficient charge to cause relay 6 immediately to reclose. This operation corresponds with the desired operation of the system inasmuch as in a short period of time, motor 20 cannot decelerate to a very low speed and the heaters of gas discharge devices cannot cool to a great extent so that the system is in operating condition. Thus, the circuit of this invention provides suitable time delay on application of power to the system without unnecessary time delays in reenergizing the system after a power interruption.

The drawing of Fig. 1 shows the arrangement of this invention for the case of a motor control system of the type wherein the applied voltage to motor 20 is varied to cause synchronism of color disk 21 with scanning operations of the television transmitter. This invention may, however, be applied to other types of motor control, as for example a control using a magnetic brake to synchronize the motor. A control system of this type is described and claimed in the aforesaid copending application of R. F. Wood (now Patent 2,502,195). The connections in this instance might be as shown in Fig. 2. In this figure, the brake to control the rotational velocity of motor 20 is shown generally at 26, the torque of this brake being determined by the force on shoe 27 associated with current flow in operating coil 28. Under operating conditions, this current flow is adjusted by means of voltage applied across terminals 29 to a value causing synchronism of the color disk with scanning operations at the television transmitter. At the instant of closing switch 3, Fig. 1, however, no voltage appears across terminals 29 by reason of the short circuit through terminals 18, thus causing the motor to accelerate to full speed without the retarding brake torque. When relay 6 is actuated, the short circuit is removed and the brake can operate in the normal fashion.

While I have shown and described a particular embodiment of this invention, it will, of course, be understood that I do not wish to be limited thereto since various modifications both in the circuit arrangements and in the instrumentalities employed may be made. In particular, the invention may be applied to purposes other than energizing color television receivers, the only requirement being that the equipment desired to be energized have circuits to which energy is desired to be applied after a time delay. I therefore contemplate in the appended claims to cover all such modifications and alternative constructions as fall within the true spirit and scope of this invention.

What I claim as new and desire to secure by Letters Patent of the United States is:

1. In combination, a source of electromotive force, a time delay load, means for connecting said time delay load to said source through a relatively large impedance, an energy storage device, means slowly to charge said device in accord with the voltage between a point on said impedance and the terminal of said time delay load not connected thereto, means to short circuit said impedance when said charge and the voltage of said source is of predetermined magnitude, thus to energize said time delay load and increase the charge on said device, an instantaneous load circuit, means for connecting said source to said instantaneous load circuit when connection is first made to said time delay load, a motor, control means to determine the operating speed of said motor, said control means being operated by said load, and means to energize said motor directly from said source when connection is first made to said load while at the same time preventing control by said control means, thus to accelerate said motor to operating speed, said last means including means causing said control means to become effective when said short circuiting means operates.

2. In a synchronizing circuit the combination comprising, a source of electromotive force, a load, means for connecting said load to said source through a relatively large impedance, an energy storage device, means slowly to charge said device in accord with the voltage between a point on said impedance and the terminal of said load not connected thereto, and means to short circuit said impedance when said charge and the voltage of said source is of predetermined magnitude, thus to energize said load and increase the charge on said device, a motor, control means to determine the operating speed of said motor, said control means being operated by said load, and means to energize said motor directly from said source when connection is first made to said load while at the same time preventing control by said control means, thus to accelerate said motor to operating speed, said last means including means causing said control means to become effective when said short circuiting means operates.

3. In a receiver for television signals comprising video and synchronizing components, said receiver having a motor driving a rotatable color filter and circuits to be energized only after a time delay, means to synchronize said color filter with said synchronizing components, a source of operating potential for said circuits, means simultaneously to connect said circuits to said source through a relatively large impedance to apply full operating potential to said motor and to render ineffective said synchronizing means, an energy storage device, means slowly to charge said device in accord with the potential between a point on said impedance and the terminal of said circuits not connected thereto, and means simultaneously to short circuit said impedance and render said first means effective when said device is charged to a predetermined degree.

ROBERT B. DOME.

REFERENCES CITED

The following references are of record in the file of this patent:

UNITED STATES PATENTS

| Number | Name | Date |
|---|---|---|
| 2,096,626 | Crago | Oct. 19, 1937 |
| 2,141,343 | Campbell | Dec. 27, 1938 |
| 2,319,789 | Chambers | May 25, 1943 |
| 2,329,194 | Goldmark | Sept. 14, 1943 |
| 2,333,272 | Ridings | Nov. 2, 1943 |
| 2,378,746 | Beers | June 19, 1945 |
| 2,379,548 | Squire | July 3, 1945 |
| 2,404,571 | Finch | July 23, 1946 |